(12) United States Patent
Lam

(10) Patent No.: US 6,782,461 B2
(45) Date of Patent: Aug. 24, 2004

(54) DYNAMICALLY ADJUSTABLE LOAD-SHARING CIRCULAR QUEUES

(75) Inventor: Siu H Lam, Woodcliff Lake, NJ (US)

(73) Assignee: Intel Corporation, Santa Clara, CA (US)

(*) Notice: Subject to any disclaimer, the term of this patent is extended or adjusted under 35 U.S.C. 154(b) by 196 days.

(21) Appl. No.: 10/082,391

(22) Filed: Feb. 25, 2002

(65) Prior Publication Data
US 2003/0163660 A1 Aug. 28, 2003

(51) Int. Cl.[7] .............................................. G06F 12/00
(52) U.S. Cl. ........................... 711/170; 710/54; 710/56; 710/57
(58) Field of Search ................................ 711/170, 173; 710/54, 55, 56, 57

(56) References Cited

U.S. PATENT DOCUMENTS

| | | | | |
|---|---|---|---|---|
| 5,381,528 A | * | 1/1995 | Brunelle | 710/56 |
| 6,044,418 A | * | 3/2000 | Muller | 710/56 |
| 6,145,061 A | * | 11/2000 | Garcia et al. | 711/154 |
| 6,314,494 B1 | * | 11/2001 | Keltcher et al. | 711/137 |
| 2003/0120886 A1 | * | 6/2003 | Moller et al. | 711/173 |

* cited by examiner

Primary Examiner—Mano Padmanabhan
Assistant Examiner—Thang Ho
(74) Attorney, Agent, or Firm—Pillsbury Winthrop LLP

(57) ABSTRACT

Dynamically adjustable load-sharing circular queues are disclosed. That is, a method of reversing the processing order of a second queue placed adjacent to a first queue to allow the space allocated to both queues to be dynamically adjusted, without copying or moving queue data or affecting the performance of the input and output queue functions is described. These advantages are attained without adding any overhead to conventional circular queues, in terms of processing and memory requirements. Dynamically adjustable circular queues are particularly useful in reducing memory requirements for simple circular queues used in serving either a primary/backup or load-sharing configuration of two input queues. A simple way of determining when the queue sizes can be adjusted is further described.

17 Claims, 5 Drawing Sheets

Queue 1 Pointers Increment in this Direction and Wrap to Queue 1 Start

Queue 2 Pointers Decrement in this Direction and Wrap to Queue 2 Start

DYNAMICALLY ADJUSTABLE LOAD-SHARING CIRCULAR QUEUES

BACKGROUND

1. Field of the Invention

Embodiments described herein are directed to adjustable load-sharing circular queues. Specifically, the size of the circular queues is changed dynamically, without any copying or moving of queue data.

2. Related Art

Simple circular queues form a common method of buffering data. A circular queue consists of an input pointer and an output pointer that are incremented each time a data element is processed, in a first-in/first-out ("FIFO") manner. Upon reaching the end of a queue, the pointers wrap around to the beginning again. While last-in/first-out ("LIFO") processing of data elements is possible, such processing is normally referred to as a stack rather than a circular queue.

Since circular queues do not require maintenance of linked lists or memory allocation because of their fixed sizes, they are especially useful in time sensitive applications. A disadvantage of circular queues is that they are not memory efficient, in that the space allocated to the queues is not dynamically changeable.

In digital network communications, a circular queue is often used in buffering incoming and outgoing high-speed data. In many instances, redundancy is a requirement such that a second queue is used to buffer a secondary data stream, either as a backup or in a load-sharing configuration. Oftentimes, a large space is needed for these queues, since high-speed network traffic frequently occurs in bursts.

Space allocated for these queues to be dynamically balanced based on the amount of traffic at each queue point would thus prove helpful. Such allocation of space reduces significantly the amount of needed memory. That is, as a result of a backup or load-sharing configuration, total traffic at the two queues will not exceed the amount of traffic incurred if only one queue were used.

U.S. Pat. No. 6,145,061, issued Nov. 7, 2000, and entitled "Method of Management of a Circular Queue for Asynchronous Access" discloses the use of a marker within queue data so as to allow sharing of circular queues by multiple processing threads as well as changing of queue size. This method adds to the operations needed in the queue input/output functions and thus affects their performance. Moreover, when queue sizes change, data copying becomes required.

A method of reversing the processing order of a second queue placed adjacent to a first queue to allow the space allocated to both queues to be dynamically adjusted, without copying or moving queue data or affecting the performance of the input/output queue functions is thus a well-needed improvement over current methods.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe dynamically adjustable load-sharing circular queues. A circular queue is a data structure similar to a queue except that it is linked at the rear to the front to form a circle. Circular queues constitute a common method of buffering data. Circular queues are especially useful for storing data that is cyclical.

A circular queue usually consists of an array that contains the items in the queue, two array indices, and an optional length. The indices are generally referred to as the head and tail pointers. The head pointer typically points to the first element in the queue, and the tail pointer normally points just beyond the last element in the queue. If the tail pointer is before the head pointer, the queue wraps around the end of the array.

Figure 1:
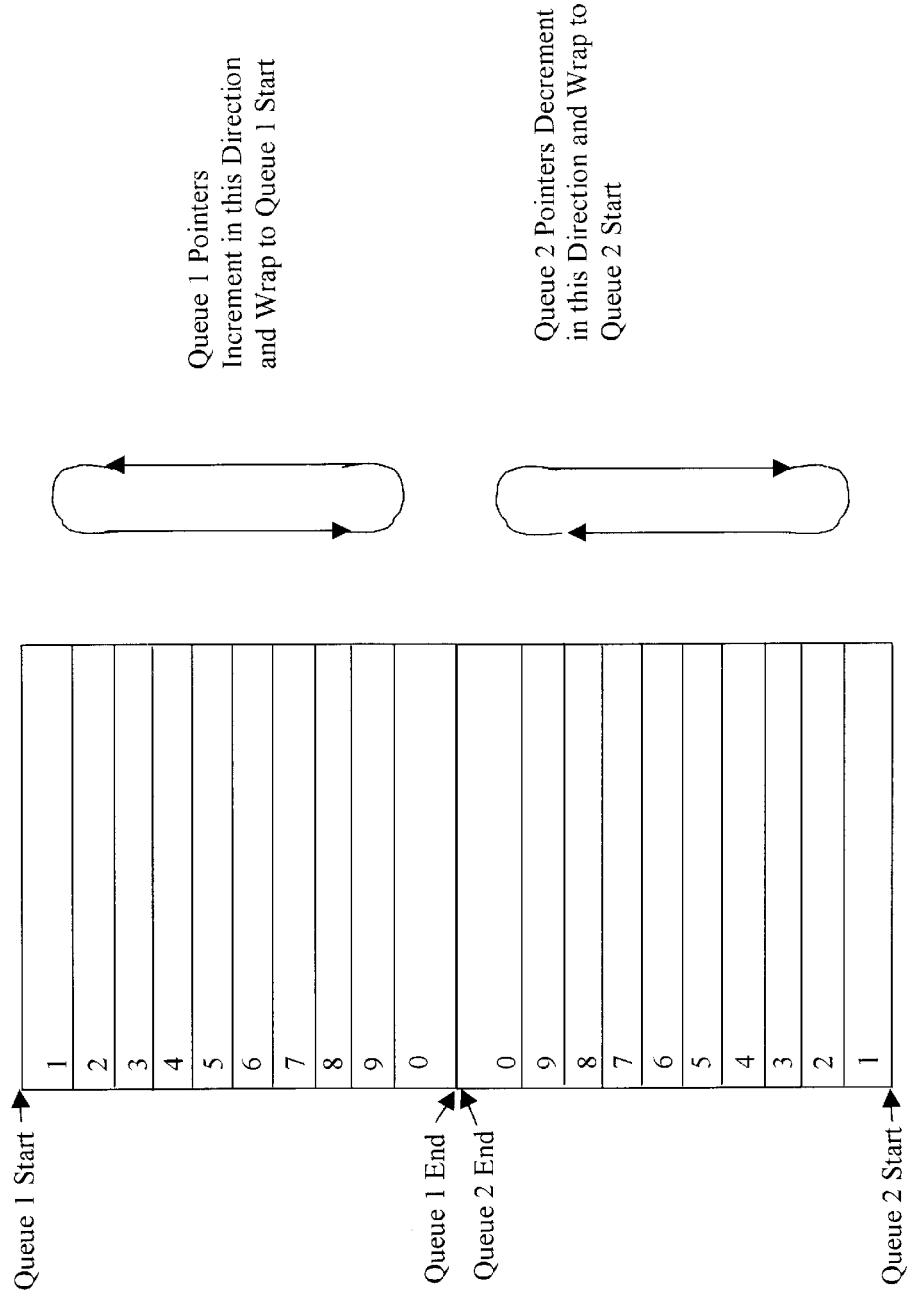
FIG. 1 is a diagram of two circular queues placed adjacent to each other, according to an embodiment of the present invention.

As shown in FIG. 1, to allow two circular queues, circular queue 1 and circular queue 2, to share a common memory space, circular queue 1 and circular queue 2 are placed physically back-to-back to each other. Circular queue 1 and circular queue 2 are each comprised of an input pointer and an output pointer that are incremented each time that a data element is processed, in a first-in/first-out ("FIFO") manner. The FIFO method is used for real-time packet processing to more readily keep time ordering. A last-in/first-out ("LIFO") method is another possible method for data element processing, but is normally associated with stacks rather than with circular queues.

The input and output pointers of circular queue 1 increment toward the end of circular queue 1. Meanwhile, the input and output pointers of circular queue 2 decrement toward the end of circular queue 2. Upon reaching the end of a circular queue area, the pointers wrap around to the beginning again. As such, circular queue 1 pointers wrap around to circular queue 1 start, while circular queue 2 pointers wrap around to circular queue 2 start.

Figures 2A, 2B, 2C:
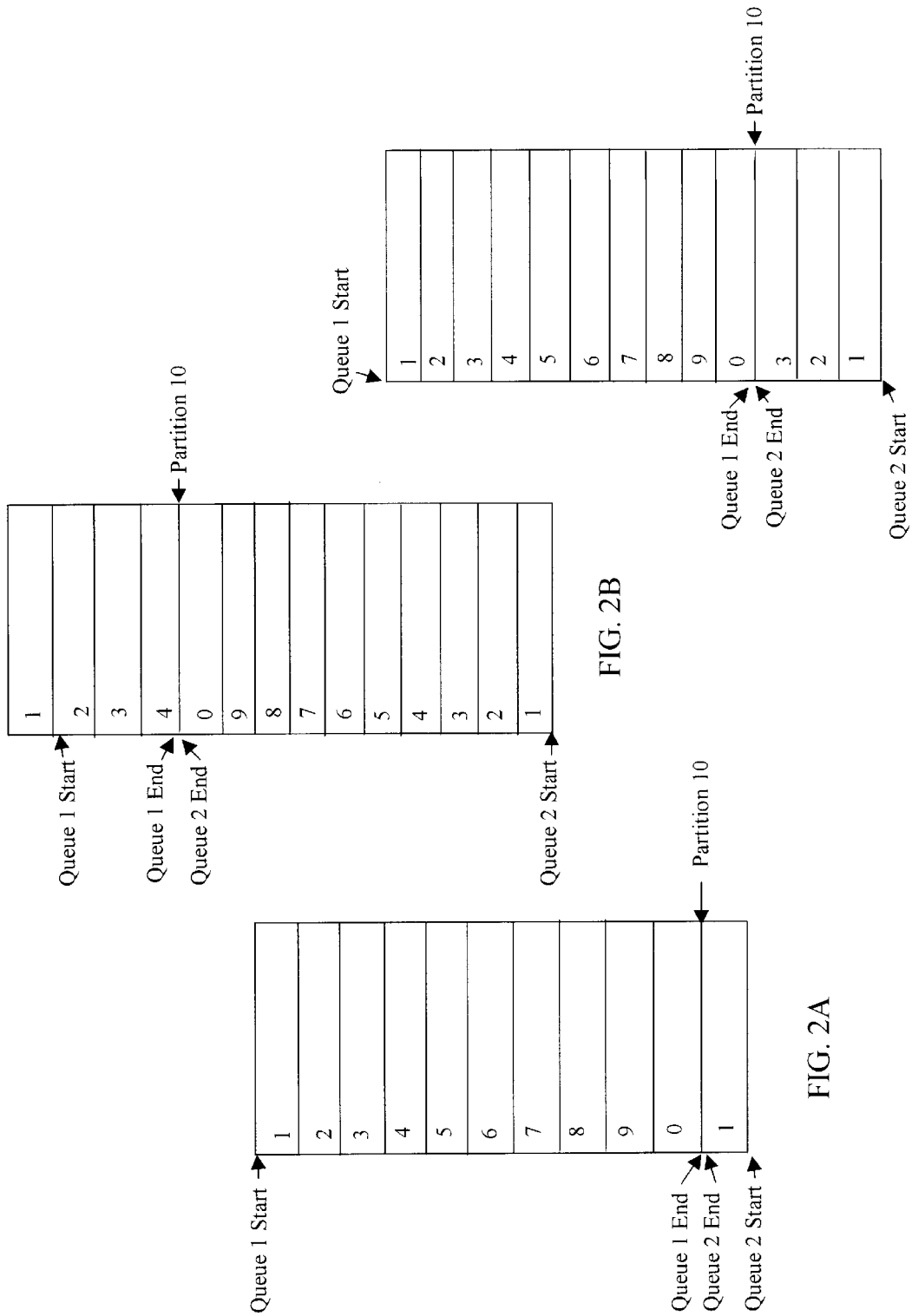
FIG. 2A is an illustration of a partition between two circular queues, according to an embodiment of the present invention.
FIG. 2B is an illustration of a partition in a varying location between two circular queues, according to an embodiment of the present invention.
FIG. 2C is an illustration of a partition in yet another position between two circular queues, according to an embodiment of the present invention.

The partition 10 between circular queue 1 and circular queue 2 is defined by the ends of circular queue 1 and circular queue 2 that typically meet one another in the middle of the memory space. As illustrated in FIGS. 2A, 2B, and 2C, by adjusting partition 10, the space allocated to circular queue 1 and circular queue 2 can be adjusted. That is, the partition 10 can move up or down, as configuration or input conditions change, with the circular queue 1 start and the circular queue 2 start remaining unchanged. As illustrated in FIG. 2A, if either circular queue 1 or circular queue 2 functions as a backup, the space allocated to it will be close to zero. In FIG. 2A, for example, the space allocated to circular queue 2 is slight in comparison to the space allocated to circular queue 1, since circular queue 1 has ten data blocks occupied while circular queue 2 only has one data block occupied. When a fail-safe switchover to the backup occurs, partition 10 is moved to allocate most of the space to a new active channel. The partition 10 adjustment may be more dynamic in a load-sharing configuration, based on the recent history of the amount of data arriving at circular queue 1 and circular queue 2.

In FIG. 2B, in contrast, the space allocated to circular queue 2 is much greater than that allocated to circular queue 1, as circular queue 2 has more data elements residing within it. In FIG. 2C, queue 1 is more active than queue 2 and thus has more space allocated to it.

Figure 3A:
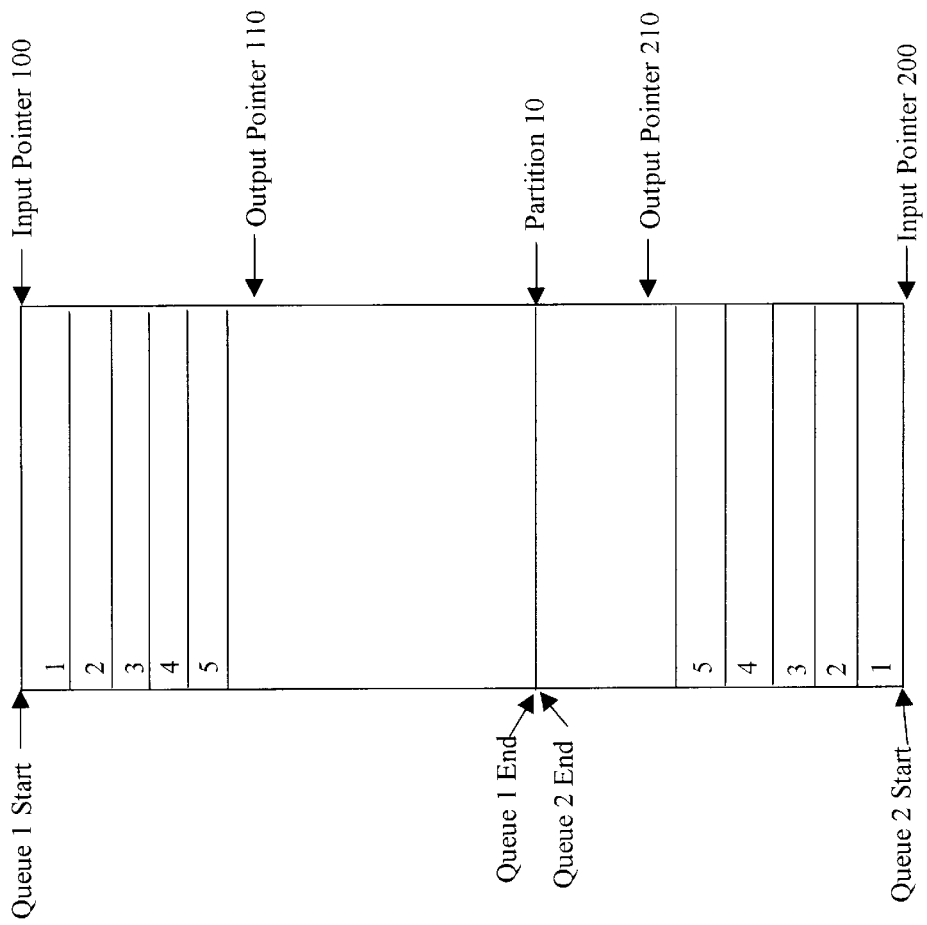
FIG. 3A is an illustration of input pointers and output pointers not straddling end points, according to an embodiment of the present invention.

The circular queue 1 end and the circular queue 2 end that form partition 10 can be moved provided that circular queue 1 and circular queue 2 do not both wrap around circular queue 1 end and circular queue 2 end. The adjustment of circular queue 1 end and circular queue 2 end should occur when the input and output pointers of circular queue 1, namely 100 and 110, and the input and output pointers of circular queue 2, namely 200 and 210, do not straddle queue 1 end and queue 2 end, as indicated in FIG. 3A. The input pointers, 100 and 200, point to the first data element in their respective circular queue. The output pointers, 110 and 210, point slightly beyond the last data element in their respective queue. FIG. 3A depicts a scenario whereby five data elements that are being processed reside in both circular queue 1 and circular queue 2. In this instance, partition 10 may be moved up or down without impacting the ongoing processing of data in either circular queue.

Figure 3B:
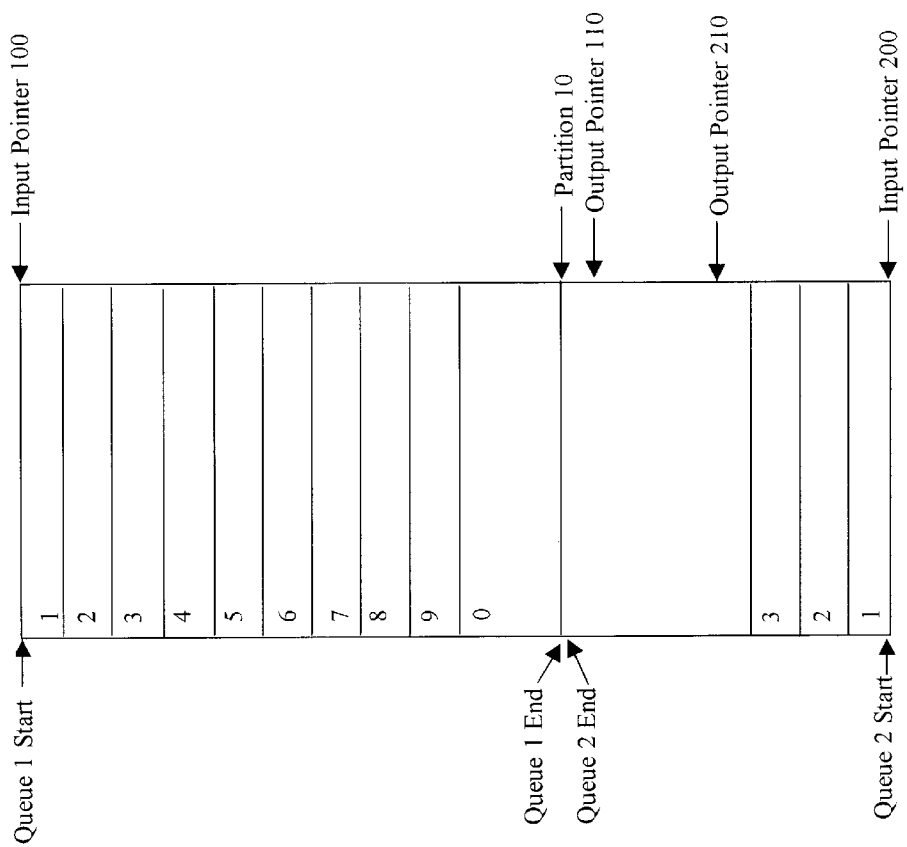
FIG. 3B is an illustration of the input pointer and the output pointer of the first circular queue straddling the first circular queue end, according to an embodiment of the present invention.

FIG. 3B, in contrast, depicts a scenario in which circular queue 1 contains ten data elements for processing while circular queue 2 only contains three data elements. The input pointer 100 and the output pointer 110 of circular queue 1 straddle the circular queue 1 end. The input pointer 200 and the output pointer 210 of circular queue 2 do not straddle the circular queue 2 end. In such a case, the partition 10 may only be moved down without disrupting data.

Figure 3C:
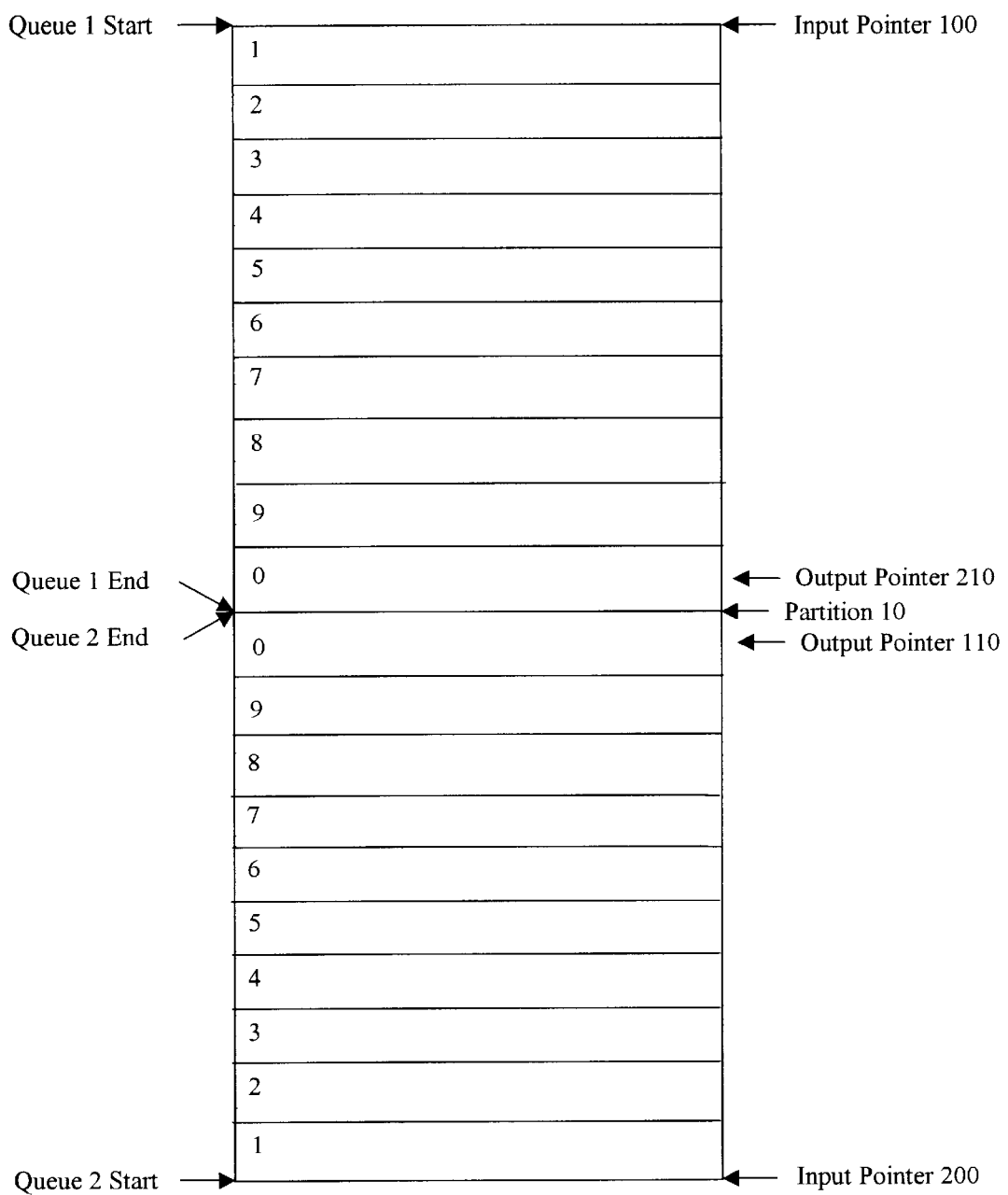
FIG. 3C is an illustration of input pointers and output pointers of the first circular queue and the second circular queue straddling end points, according to an embodiment of the present invention.

In FIG. 3C, the partition 10 cannot be moved in either direction. That is, input pointer 100 and output pointer 110 straddle circular queue 1 end. Similarly, input pointer 200 and output pointer 210 straddle circular queue 2 end. Since data resides immediately on either side of partition 10, partition 10 cannot be moved without physically moving, and hence disrupting, the data. In this case, circular queue 1 and circular queue 2 overlap.

A simple mechanism is used to indicate the straddling condition. When input pointer 100 or 200 wraps around an end point, a first straddling flag or a second straddling flag is set. When the output pointer 110 or 210 wraps around the end point, the corresponding straddling flag is reset. Straddling flags are instrumental in determining whether circular queue ends can move. Queue size adjustment can then take place in the background with no effect on the performance of data queuing and de-queuing. This advantage is attained without adding any overhead to conventional circular queues, in terms of processing and memory requirements. This is particularly useful in reducing memory requirements for simple circular queues that serve as either a primary/backup or load-sharing configuration of two input queues.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A system of adjustable circular queues, comprising:
    a first circular queue, placed end-to-end to a second circular queue, having an input pointer, an output pointer, a start, and an end;
    the second circular queue, placed end-to-end to the first circular queue, having an input pointer, an output pointer, a start, and an end; and
    a partition between the first circular queue and the second circular queue as defined by the end-to-end meeting of the first circular queue end and the second circular queue end; wherein the system functions to:
        set a first straddling flag when the first circular queue input pointer wraps around the first circular queue end;
        set a second straddling flag when the second circular queue input pointer wraps around the second circular queue end;
        reset the first straddling flag when the first circular queue output pointer wraps around the first circular queue end;
        reset the second straddling flag when the second circular queue output pointer wraps around the second circular queue end; and
        adjust the first circular queue end and the second circular queue end provided that the first circular queue and the second circular queue do not wrap around the first circular queue end and the second circular queue end.

2. The system of claim 1, wherein the input pointer and the output pointer of the first circular queue increment toward the first circular queue end when a data element is processed.

3. The system of claim 2, wherein the input pointer and the output pointer wrap around to the first circular queue start upon reaching the first circular queue end.

4. The system of claim 1, wherein the input pointer and the output pointer of the second circular queue decrement toward the second circular queue end when a data element is processed.

5. The system of claim 4, wherein the input pointer and the output pointer wrap around to the second circular queue start upon reaching the second circular queue end.

6. The system of claim 1, wherein the adjustment of the first circular queue end and the second circular queue end occurs when the input pointer and the output pointer of the first circular queue and the input pointer and the output pointer of the second circular queue do not straddle the first circular queue end and the second circular queue end.

7. A method of adjusting circular queues, comprising:
    fixing a first straddling flag when a first circular queue input pointer wraps around a first circular queue end, in which a first circular queue is placed end-to-end with a second circular queue;
    fixing a second straddling flag when a second circular queue input pointer wraps around a second circular queue end, in which a second circular queue is placed end-to-end with the first circular queue;
    refixing the first straddling flag when a first circular queue output pointer wraps around the first circular queue end;

refixing the second straddling flag when a second circular queue output pointer wraps around the second circular queue end; and moving the first circular queue end and the second circular queue end provided that the first circular queue and the second circular queue do not wrap around the first circular queue end and the second circular queue end, while a first circular queue start and a second circular queue start remain fixed.

8. The method of claim 7, wherein the first circular queue and the second circular queue are placed end-to-end and meet at a partition.

9. The method of claim 8, wherein the partition may be adjusted up or down while the first circular queue start and the second circular queue start remain static.

10. The method of claim 7, wherein the input pointer and the output pointer of the first circular queue increment and the input pointer and the output pointer of the second circular queue decrement each time that data is processed.

11. A computer readable medium and a computer readable program code stored on the computer readable medium having instructions to:

set a straddling flag when an input pointer of a circular queue that is placed end-to-end with another circular queue wraps around an endpoint of the circular queue;

reset the straddling flag when an output pointer of the circular queue wraps around the endpoint of the circular queue; and adjust circular queue size by allowing the endpoint of the circular queue to move if the input pointer of the circular queue and the output pointer of the circular queue do not straddle the endpoint of the circular queue.

12. The computer readable medium of claim 11, wherein adjustment of circular queue size reduces memory requirements for circular queues used in serving at least one of a primary, a backup, and a load-sharing configuration of two input queues.

13. The computer readable medium of claim 11, wherein two circular queues are placed end-to-end to each other and meet at a partition that is adjusted up or down to change circular queue size.

14. A data structure for circular queues, comprising:

a first circular queue having a first circular queue start and a first circular queue end;

a second circular queue having a second circular queue start and a second circular queue end;

a partition between the first circular queue and the second circular queue, as defined by the end-to-end meeting of the first circular queue end and the second circular queue end; and at least one data element occupying at least one of the first circular queue and the second circular queue.

15. The data structure of claim 14, wherein the first circular queue has an input pointer that points to a first data element in the first circular queue and an output pointer that points beyond a final data element in the first circular queue.

16. The data structure of claim 14, wherein the second circular queue has an input pointer that points to a first data element in the second circular queue and an output pointer that points beyond a final data element in the second circular queue.

17. The data structure of claim 14, wherein the partition may be adjusted when the input pointer and the output pointer of the first circular queue and the input pointer and the output pointer of the second circular queue do not overlap the first circular queue end and the second circular queue end.

* * * * *